United States Patent [19]

Whitney, Jr.

[11] Patent Number: 4,891,902

[45] Date of Patent: Jan. 9, 1990

[54] FISHING BOBBER AND DEPTH FINDER

[76] Inventor: Ralph L. Whitney, Jr., 11R Summer St., Westborough, Mass. 01581

[21] Appl. No.: 116,812

[22] Filed: Nov. 5, 1987

Related U.S. Application Data

[63] Continuation-in-part of Ser. No. 18,015, Feb. 24, 1987, abandoned.

[51] Int. Cl.$^4$ ............................................. A01K 83/00
[52] U.S. Cl. .................................. 43/43.11; 43/44.87
[58] Field of Search ................. 43/43.11, 44.87, 44.88, 43/44.91, 44.95

[56] References Cited

U.S. PATENT DOCUMENTS 2,607,154  8/1952  Martens ............................. 43/43.11
4,757,635  7/1988  Cole ................................... 43/44.88

Primary Examiner—Kurt Rowan
Attorney, Agent, or Firm—John E. Toupal; Harold G. Jarcho

[57] ABSTRACT

A combination fishing bobber and depth finder for use in setting a sinker and hook at the end of fishing line a preselected distance above the bottom of a body of water includes a spool around which a preselected length of the fishing line may be wound, a projection having a trapezoidally shaped opening and a pair of holes at the ends of the opening through which the fishing line passes and a line locking pin loosely disposed in the opening for selectively regulating the passage of fishing line through the trapezoidal opening.

19 Claims, 2 Drawing Sheets

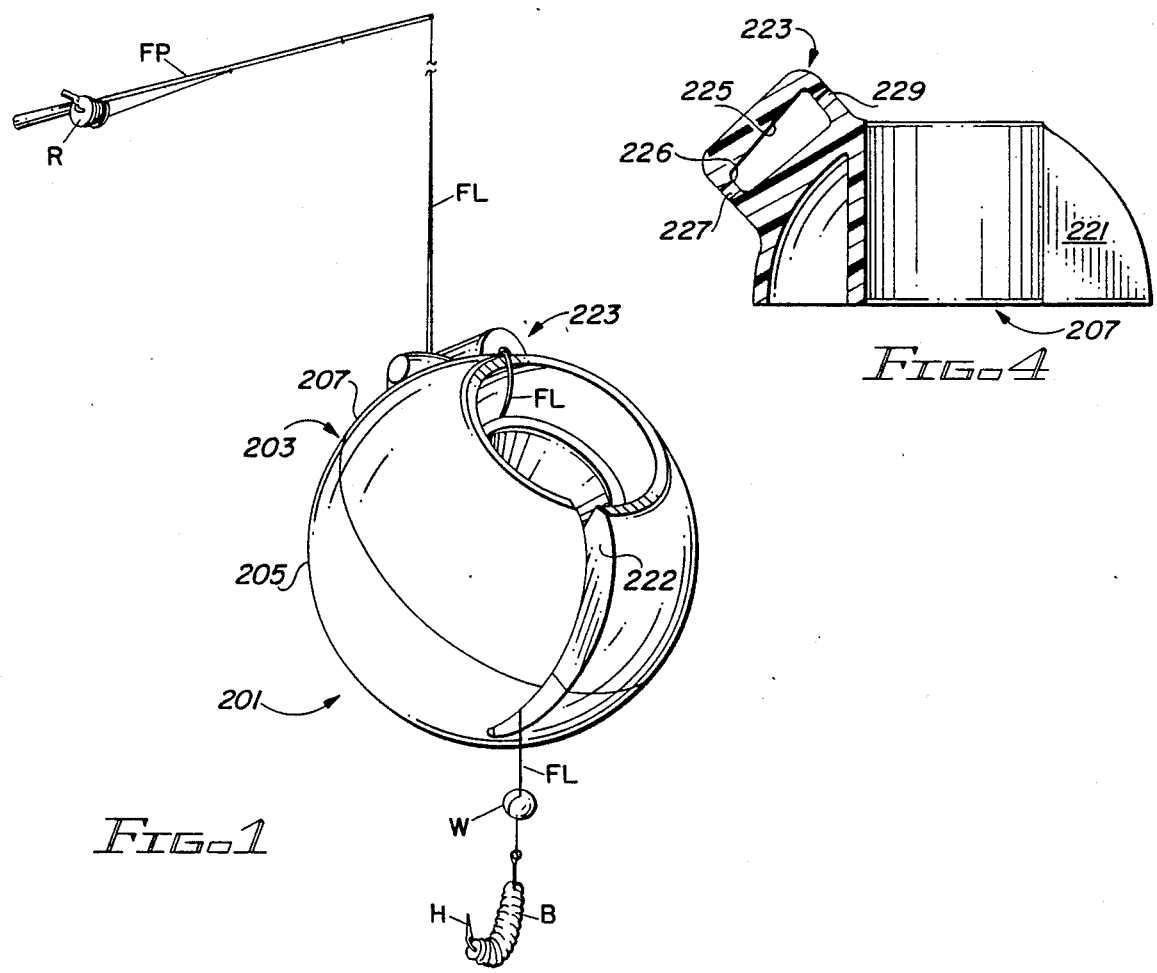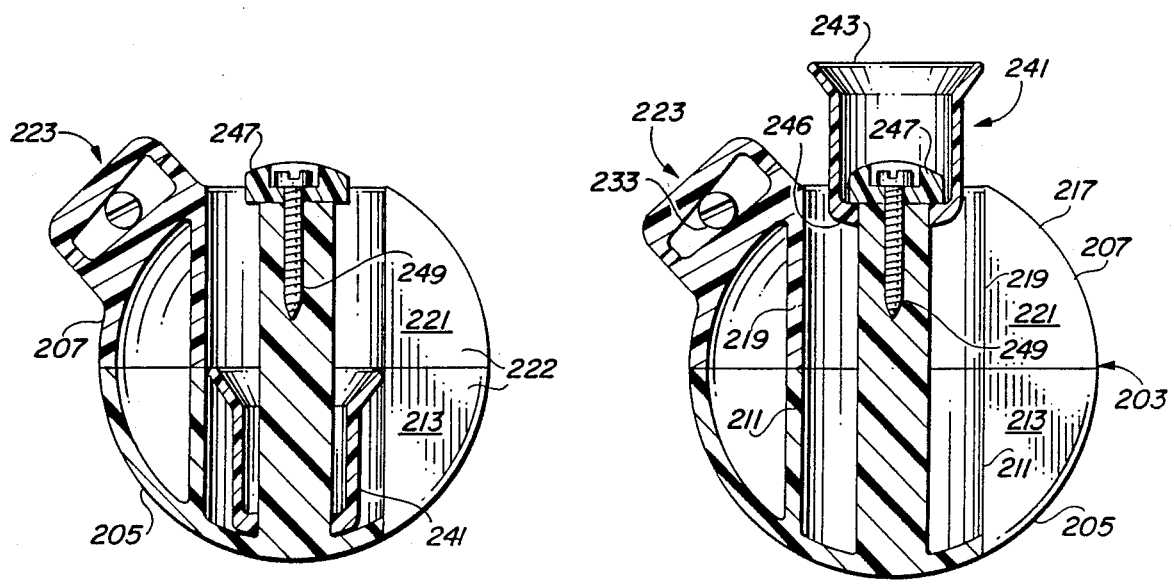

FISHING BOBBER AND DEPTH FINDER

CROSS-REFERENCE TO RELATED APPLICATION

This application is a continuation-in-part of U.S. Pat. application Ser. No. 07/018,015, "Fishing Bobber and Depth Finder", filed on Feb. 24, 1987 now abandoned.

BACKGROUND OF THE INVENTION

The present invention relates generally to fishing bobbers and, more particularly, to a combination fishing bobber and depth finder.

The art of cast fishing has evolved over the centuries both as a means for obtaining food and as a source of recreational pleasure. While significant changes in cast fishing have been made through the ages, the difficulty associated with setting a baited hook at a desirable depth based on the depth of the water has not, until now, been overcome with a great deal of success.

Much of the prior art has been concerned with setting a baited hook at a pre-selected depth below the top surface of the water without taking into account the depth of the water. This approach can be thought of as a top-down approach because its strategy is to float the bobber on the surface of the water and then to allow a predetermined amount of line to migrate downward from the bobber. A number of patents exist on the top-down approach.

For example, in U.S. Pat. No. 4,251,941 issued on Feb. 24, 1981 to D. V. Howard there is disclosed a self-threading casting bobber for automatically letting out a predetermined length of fishing line to position a sinker and hook attached to the line at a predetermined depth beneath the bobber. The predetermined amount of fishing line is wound around a rotatable spool mounted within the bobber and a selectively actuable lock mechanism fixedly clamps the predetermined length of fishing line within the bobber.

As another example, in U.S. Pat. No. 4,406,081 issued on Sept. 27, 1983 to D. R. Garner, a fishing bobber having an automatic line release feature wherein a predetermined length of fishing line to be released is wound around a spool formed by an annular flange on one side and a bobber on the other side is disclosed. A pin extends through the bobber with a hook-shaped end which retains the fishing line in place. An opposite end of the pin is terminated in a cylindrical stub which is free to move up and down within a well. The fishing line is connected to the stub so that upward tension occurs during casting, forcing the pin and, in particular, the hook-shaped portion retaining the line upwardly, closing the spool. When line tension is released, the cylindrical stub falls and so does the hook which retains the line, thereby, enabling the line to slide off the spool.

In still another example, in U.S. Pat. No. 3,977,115 issued on Aug. 31, 1976 to A. Check, there is disclosed a plastic float for use on a fishing line having a spool for holding a secondary fishing line to which a baited hook is attached. The spool includes two adjusting slots for adjusting the secondary fishing line to any specific depth in the water and also includes a locking and release collar for releasing a trigger holding a weighted ring, leader, and hook for use in the operation of the device.

In a further example, in U.S. Pat. No. 4,199,889 issued on Apr. 29, 1980 to Van Orden et al, a fishing float for use with a fishing line to support a baited hook at any desired depth below the surface of the water is disclosed. The float is constructed so that a predetermined amount of line can be wrapped around the surface of the float before casting and will remain wrapped while the float, sinker, and bait are airborne. In addition, once the float strikes the water, there exists a mechanism for feeding out the slack line on the float until it completely unwinds.

In addition to the aforementioned prior art concerned with the top-down approach, some prior art concerned with the bottom-up approach is also known. In the bottom-up approach, the depth of the water is determined by some depth-finding mechanism. Then, contingent to the depth of the water, a baited hook is set by some mechanism to an arbitrary but adjustable distance above the bed of the body of water.

For example, in U.S. Pat. No. 4,047,319 issued on Sept. 13, 1977 to W. P. Duncan, a fishing device for locating the depth of a body of water and for adjusting a hook on a fishing line to be set at any desired height relative to the bed of the body of water is disclosed. The device comprises a float containing a tubular assembly having two frictional means: one permits the line to move only towards the bed of the body of water, and the second restricts movement of the line in both directions. A disengagement means, when actuated, permits free movement of the line in both directions.

As another example, in U.S. Pat. No. 2,208,240 issued on Jul. 16, 1940 to Arnesen et al, a combination fishing bobber and depth finder is disclosed. The bobber body is buoyant and has a vertical aperture through which the fishing line passes. The aperture is enlarged at one end to form a chamber of entirely downwardly divergent conical shape and a generally spherical element is contained in the chamber as means for restricting movement of the line upwards in the measurement of the depth of the body of water. The baited hook is elevated off the bottom of the water by insertion of the fishing line into a U-shaped wire and the newly established float to baited hook distance is maintained by tying a knot in the fishing line above the float.

It is an object of the present invention to provide a new and improved combination fishing bobber and depth finder.

It is another object of the present invention to provide a combination fishing bobber and depth finder that is easy to manufacture, easy to attach to a fishing line, and easy to use.

It is still another object of the present invention to provide a combination fishing bobber and depth finder that does not require the attachment of any secondary lines for its use.

It is yet another object of the present invention to provide a combination fishing bobber and depth finder that does not require any additional knotting of the fishing line for its use.

SUMMARY OF THE INVENTION

A combination fishing bobber and depth finder for use with a fishing line constructed according to the teachings of the present invention comprises in one embodiment a bobber that is hollow and spherically shaped, a spool mounted for sliding movement radially in and out of the body, the spool having a central region around which a pre-selected length of the fishing line may be wound and control means for controlling movement of the fishing line relative to the spherically shaped bobber. The control means functions in a first depth finding condition to allow movement of the line away from the pole, in a second depth finding condition to prevent movement of the line toward the pole, in a fishing condition to engage and thereby prevent movement of the line away from the pole and in an automatically induced retrieval condition to allow movement of the line in directions either toward or away from the pole.

Various features and advantages will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

DESCRIPTION OF THE DRAWINGS

In order that the invention may be more fully understood, it will now be described, by way of example, with reference to the accompanying drawings in which like reference numerals or characters represent like parts and wherein:

FIG. 1 is a perspective view of a preferred embodiment of the invention attached to a fishing line and ready for casting;

FIG. 2 is a side section view of the embodiment of the invention shown in FIG. 1 with the spool disposed inside of the bobber in its inner position;

FIG. 3 is a section view partly of the embodiment of the invention as shown in FIG. 1 with the spool in its outer position;

FIG. 4 is a section view of the top half of the spherical bobber shown in FIG. 1;

DESCRIPTION OF THE PREFERRED EMBODIMENT

The present invention is directed to a combination fishing bobber and depth finder which is capable of setting a baited hook attached to the end of a fishing line at a particular desired distance above the bottom of a body of water.

Figure 5:
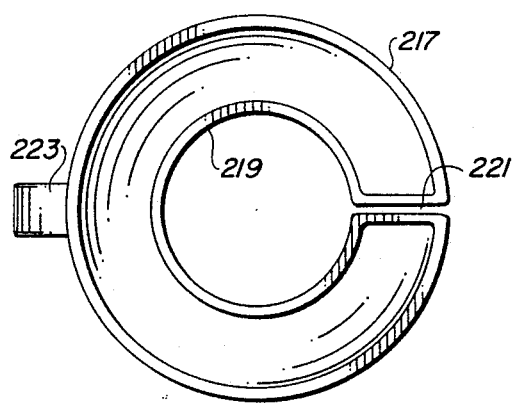
FIG. 5 is a plan view taken from the bottom of the half section shown in FIG. 4.
Figure 6:
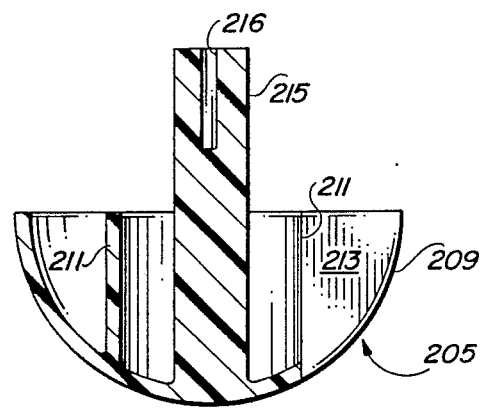
FIG. 6 is a section view of the bottom half of the spherical bobber shown in FIG. 1.
Figure 7:
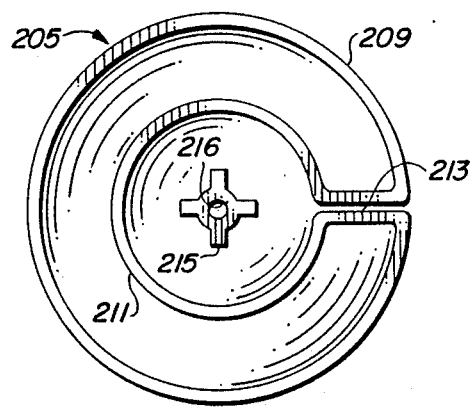
FIG. 7 is a plan view taken from the top of the half section shown in FIG. 6.
Figure 8:
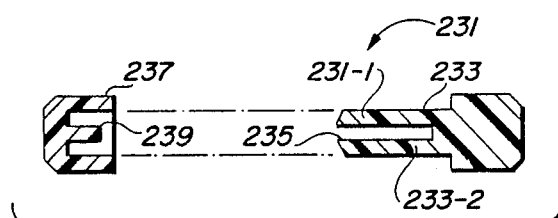
FIGS. 8 and 9, respectively are a section view and an exploded view partly in section respectively, of the line locking pin assembly shown in FIG. 1.
Figure 9:
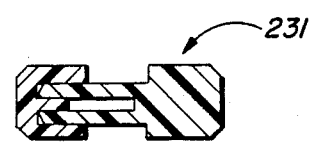
Figure 10:
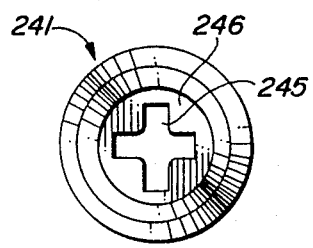
FIG. 10 is a plan view taken from the bottom of the spool shown in FIG. 2.

FIGS. 1 through 10 illustrate a preferred embodiment of a combination fishing bobber and depth finder constructed according to this invention and identified by reference numeral 201.

Device 201 includes a hollow spherically shaped bobber 203 made of a lightweight plastic, such as polypropylene or other suitable material. Bobber 203 may be made by injection molding.

Bobber 203 comprises two hemispherically shaped hollow sections 205 and 207 which are fixedly secured to each other by any suitable means, not shown, such as solvent bonding mechanical seals (i.e. nuts and bolts or screws) or sonic welding. Lower section 205 includes an outer wall 209, an inner wall 211 and a slot 213 extending from outer wall 209 through inner wall 211. A spool mounting post 215 having a cross-shaped cross section (see FIG. 17) extends upward from the bottom of section 205. A screw mounting hole 216 extends down from the top of post 215. Section 207 includes an outer wall 217, an inner wall 219 and a slot 221 which extends from outer wall 217 through inner wall 219. When the two half sections 205 and 207 are joined together, as shown, to form a spherically shaped bobber, the area between the outer walls 209 and 217 and the inner walls 211 and 219 define a closed off air chamber and the two slots 213 and 221 form a single slot 222. A structure 223 extends out from section 207. Structure 223 which is integrally formed on section 207 includes an opening 225 tapered between a narrow end 226 and a wide end 228. Line passage holes 227 and 229 extend into the opening 225 adjacent, respectively, to the ends 226 and 228.

A line locking pin assembly 231 is removably mounted in opening 225 and forms therewith a line control structure. Pin assembly 231 includes a pin 233 having a slot 235 and an end cap 237. The diameter of the pin 233 is intermediate to the lengths of the wide and narrow ends 228, 226. End cap 237 includes a post 239. When cap 237 is inserted onto the pin 233 post 239 extends into slot 235 so as to prevent the two half sections 233-1 and 233-2 of pin 233 from being squeezed together when pressure is applied to them.

A hollow spool 241 made of plastic or other suitable material is slidably mounted on post 215 and movable from an inner position, see FIG. 2 to an outer position, see FIG. 3. Spool 241 is open at the top 243 and has a cross-shaped opening 245 in an end wall 246 at the bottom corresponding in size and shape to the cross section of post 215. Spool 241 is kept from falling out of or being pulled out of post 215 by means of an end cap 247 which is attached to post 215 by a self threading screw 249. As can be appreciated, spool 241 can move slidably along post 215 from an inner position, see FIG. 2, to an outer position, see FIG. 3, but cannot be rotated axially on post 215.

During use of the device 201, the line control structure 225, 231 is sequentially actuated into first and second depth finding conditions, a fishing condition and a retrieval condition. In the first depth finding condition, a fishing line FL is fed through hole 227 at the narrow end 226 of opening 225, passed under (or over) pin assembly 231 and then fed through hole 229 at the wide end of opening 225. A weight W and hook H having a bait B are attached to the passed through end of fishing line FL. Line FL is then cast to find the depth.

When the buoyant device 201 hits the water, the top portion 207 of body 203 will be facing down, because it contains projection 223 and pin assembly 231 and thus is heavier than lower portion 205. As a result, pin assembly 231 will move to the lower and wider end 228 of opening 225 allowing fishing line FL to pass freely through projection 223 and away from the pole until it strikes bottom. Spool 241 will be at its outer position on bobber 203, although this has no particular significance.

Line FL is then reeled in to establish the second depth finding condition. When line FL starts to get reeled through opening 225, pin assembly 231 will be pushed because of its frictional contact with line FL, up to narrow end 226 of opening 225 and become wedged thereat to prevent any further movement of line FL through opening 225. Post 239 will keep the two portions of pin 233 apart so as to maintain the tight fit. However, the operator will be able to reel in the length of line FL between device 201 and the fishing pole.

After line FL is reeled in, pin assembly 231 is removed to establish therefore the fishing condition. Line FL is first pulled in an amount equal to the desired distance the hook should be above the bottom. Pin assembly 231 is then reinserted in opening 225; however, this time line FL is passed through slot 235 in pin 233. Pin 233 is then rotated about two turns so that line FL will be wound around it about two times. The length of line FL from device 201 to the hook H is then wound around spool 241. Device 201 is then turned up so that spool 241 is in its inner position in bobber 203 with line FL extending out through slot 232 and the pin 233 is wedged in the narrow end 226. Line FL is then ready for fishing.

When line FL is cast and device 201 hits the water, device 201 will be facing downward because of the way it is weighted, as noted before. As a result, spool 241 will be in its outer position as shown in FIG. 3 and the length of line FL wound around spool FL will be able to unravel and the line will go to the preset distance in the water. However, movement of additional line through the guide holes 227, 229 is prevented by the wedged pin 233.

Finally, the retrieval condition of the device 201 is established automatically in response to a tug on the line FL by a hooked fish. When a fish pulls on line FL, the pulling will be sufficient to unwedge and rotate pin 229 back the two turns so that the line unwinds from pin 233 and can pass freely in either direction through the guide holes 227, 229 and not be effected by pin 233.

Obviously, many modifications and variations of the present invention are possible in light of the above teachings. It is to be understood, therefore, that the invention can be practiced otherwise than as specifically described.

What is claimed:

1. A combination fishing bobber and water depth finder device comprising:
   a buoyant body means defining guide means for guiding passage of a fishing line during movement toward and away from an attached fishing pole; and
   a line control means supported by said body means and sequentially actuatable into either first or second depth finding conditions, a fishing condition or a retrieval condition; said control means adapted in said first depth finding condition to allow movement of the line through said guide means in a direction away from the pole and in said second depth finding condition to prevent movement of the line through the guide means in a direction toward the pole; said control means further adapted in said fishing condition to engage and thereby prevent movement of the line through the guide means and to shift automatically into said retrieval condition which allows complete unrestricted movement of the line through said guide means in directions either away from or toward the pole.

2. A device according to claim 1 wherein said control means comprises structural means defining an opening tapered between a wide end and a narrow end and a pin retained in said opening and having a diameter intermediate to the length of said wide and narrow ends; said guide means guides the line through said opening between said wide and narrow ends; and said pin is adapted to be releaseably coupled to the line in said fishing condition and to be automatically decoupled therefrom in response to said shift into said retrieval condition.

3. A device according to claim 2 wherein said pin defines a slot for receiving the line with said control means in said fishing and retrieval conditions.

4. A device according to claim 3 wherein said pin comprises end caps larger than said wide end so as to retain said pin in said opening.

5. A device according to claim 4 wherein one of said end caps is detachable so as to provide access to said slot.

6. A device according to claim 2 wherein said guide means comprises first and second line accommodating passages defined by said structural means, said first passage disposed adjacent to said wide end and said second passages disposed adjacent to said narrow end.

7. A device according to claim 6 wherein said passages comprise holes through said structural means.

8. A device according to claim 6 wherein said structural means defines an open slot intersecting said opening and extending between said wide and narrow ends thereof.

9. A device according to claim 8 wherein said guide means comprises a retainer extending between side walls of said slot and spaced from a bottom wall thereof so as to define therewith said first passage.

10. A device according to claim 9 wherein said second passage is spaced from said bottom wall by a distance greater than the spacing therefrom of said first passage.

11. A device according to claim 1 wherein said buoyant body defines a central cavity, and including a spool retained in said cavity and movable by gravity between a inner position within said cavity and an outer position projecting therefrom, and said buoyant body is weighted to assure a floating orientation with said spool projecting downwardly in said outer position.

12. A device according to claim 11 wherein said control means comprises structural means defining an opening tapered between a wide end and a narrow end and a pin retained in said opening and having a diameter intermediate to the length of said wide and narrow ends; said guide means guides the line through said opening between said wide and narrow ends and with said body in said floating condition said narrow end is above said wide end.

13. A device according to claim 12 wherein said pin defines a slot for receiving the line with said control means in said fishing and retrieval conditions.

14. A device according to claim 13 wherein said pin comprises end caps larger than said wide end so as to retain said pin in said opening.

15. A device according to claim 14 wherein one of said end caps is detachable so as to provide access to said slot.

16. A device according to claim 15 wherein said structural means defines an open slot intersecting said opening and extending between said wide and narrow ends thereof.

17. A device according to claim 16 wherein said guide means comprises a retainer extending between side walls of said slot and spaced from a bottom wall thereof so as to define therewith said first passage.

18. A device according to claim 17 wherein said second passage is spaced from said bottom wall by a distance greater than the spacing therefrom of said first passage.

19. A combination fishing bobber and water depth finder device comprising:
 a buoyant body means defining guide means for guiding passage of a fishing line during movement toward and away from an attached fishing pole;
 a line control means supported by said body means and sequentially actuatable into either first or second depth finding conditions, a fishing condition or a retrieval condition; said control means adapted in said first depth finding condition to allow movement of the line through said guide means in a direction away from the pole and in said second depth finding condition to prevent movement of the line through the guide means in a direction toward the pole; said control means further adapted in said fishing condition to engage and thereby prevent movement of the line through the guide means and to shift automatically into said retrieval condition which allows movement of the line through said guide means in directions toward the pole; and
 wherein said control means comprises structural means defining an opening tapered between a wide end and a narrow end and a pin transversely retained in said opening and having a diameter intermediate to the length of said wide and narrow ends; said guide means guides the line through said opening between said wide and narrow ends; and said pin is adapted to be releaseably coupled to the line in said fishing condition and to be automatically decoupled therefrom in response to said shift into said retrieval condition.

* * * * *